United States Patent
Sajayan et al.

(10) Patent No.: US 8,078,897 B2
(45) Date of Patent: Dec. 13, 2011

(54) POWER MANAGEMENT IN FEDERATED/DISTRIBUTED SHARED MEMORY ARCHITECTURE

(75) Inventors: Sajish Sajayan, C.V. Raman Nagar (IN); Alok Anand, Bangalore (IN); Sudhakar Surendran, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 419 days.

(21) Appl. No.: 12/356,286

(22) Filed: Jan. 20, 2009

(65) Prior Publication Data

US 2009/0193270 A1 Jul. 30, 2009

Related U.S. Application Data

(60) Provisional application No. 61/022,008, filed on Jan. 18, 2008.

(51) Int. Cl.
*G06F 1/26* (2006.01)
(52) U.S. Cl. .......................................... 713/324; 713/330
(58) Field of Classification Search .................... 713/300
See application file for complete search history.

(56) References Cited

U.S. PATENT DOCUMENTS

| | | | |
|---|---|---|---|
| 7,796,458 B2 * | 9/2010 | Rao | 365/226 |
| 7,894,229 B2 * | 2/2011 | Lahtinen et al. | 365/51 |
| 2008/0056051 A1 * | 3/2008 | Mayer et al. | 365/230.03 |
| 2008/0313482 A1 * | 12/2008 | Karlapalem et al. | 713/324 |
| 2009/0147557 A1 * | 6/2009 | Lahtinen et al. | 365/51 |

FOREIGN PATENT DOCUMENTS

WO   WO 2007072435 A2 *  6/2007

* cited by examiner

*Primary Examiner* — Ryan Stiglic
(74) *Attorney, Agent, or Firm* — Robert D. Marshall, Jr.; W. James Brady; Frederick J. Telecky, Jr.

(57) ABSTRACT

This invention is a power management scheme for a shared memory multiprocessor system which splits the control logic between the master-specific logic and memory bank logic. Power-down is initiated from a central power-down controller. This central power-down controller informs the master and target specific logic. Further memory accesses are blocked. All pending activities complete. The central controller then proceeds to power down the memory and informs the master and target specific logic upon completion. No requests for wakeup are initiated by master-specific logic from the time a power-down request is received until the completion of power-down.

4 Claims, 3 Drawing Sheets

POWER MANAGEMENT IN FEDERATED/DISTRIBUTED SHARED MEMORY ARCHITECTURE

CLAIM PRIORITY

This application claims priority under 35 U.S.C. 119(e)(1) to U.S. Provisional Application No. 61/022,008 filed Jan. 18, 2008.

TECHNICAL FIELD OF THE INVENTION

The technical field of this invention is power controlling shared memories in a multiprocessor system.

BACKGROUND OF THE INVENTION

SRAM memories in advanced technology nodes consume significant amount of leakage power. Powering down memories when not in use for long periods is one of the methods used to reduce overall power consumption in a system on a chip (SOC). However, memories that are shared by multiple masters need special handling for power down and wakeup. The problem is compounded in the case of federated memory controller architectures where the controller logic is split into master-specific and target specific blocks. In such a shared memory controller there is both per-CPU and per-bank logic.

In such architectures, different accesses may be in flight in different portions of the logic, when a request for power down is made from one or more masters. These accesses need to be completed before powerdown can take place. Similarly, when a wake-up occurs all components of the federated architecture must be informed so resume their normal operation which would have been suspended when the powerdown occurred.

SUMMARY OF THE INVENTION

This invention is a power management architecture scheme which splits the controller logic between the master-specific logic and the target specific logic of a shared memory controller architecture. Power-down is initiated from a central power-down controller. This central power-down controller informs the master and target specific logic of a requested power down. The master and target specific logic completes all activities corresponding to memory accesses in flight and notifies the central power-down controller of their completion. The central controller then proceeds to power down the memory and informs the master and target specific logic upon completion. No requests for wakeup are initiated by master-specific logic from the time a power-down request is received until the completion of power-down is signaled. This also prevents new accesses while the central controller is powering down the memories.

No accesses in flight in any part of the federated architecture are lost during power-down. All accesses initiated before power-down are brought to logical conclusion before power-down. New accesses are prevented while power-down is in progress.

In case of a wakeup, the central powerdown controller wakes up the memory and informs the master and target specific logic. Upon this notification the master and target specific logic may proceed with their normal activities.

This invention is a hardware solution for handling power down in a federated architecture memory controller. All components of the federated architecture are involved and informed of the power-down process so that power-down state coherency is maintained without software intervention. The timing closure advantages of the federated memory controller architecture are not lost due to overhead of power management. This would have happened using a centralized power management controller.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
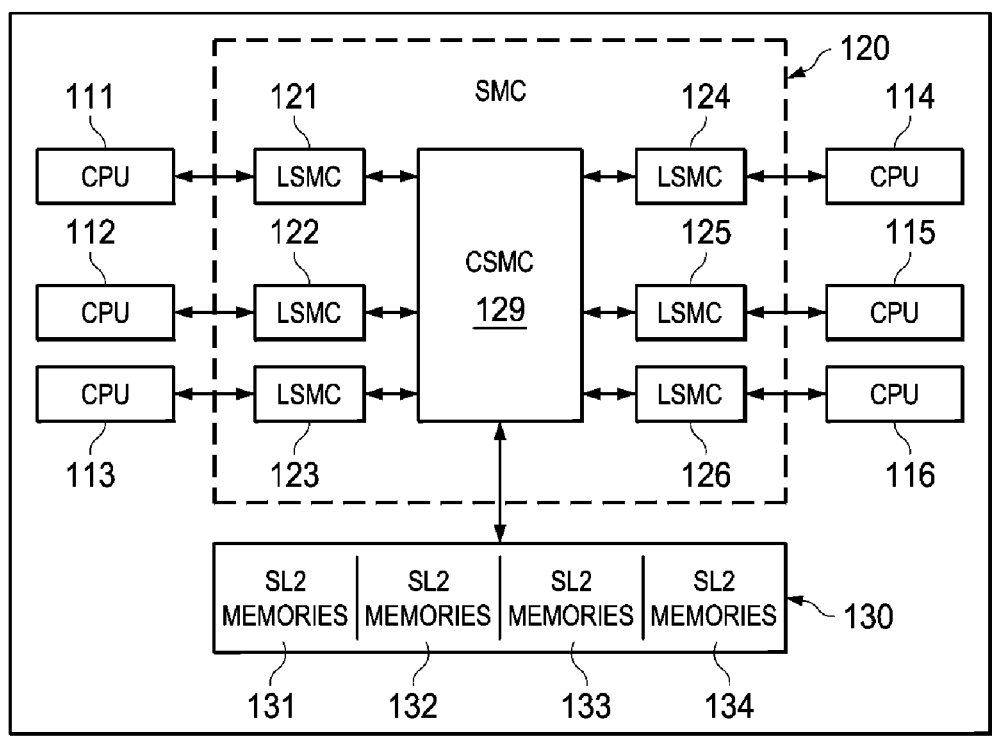
FIG. 1 is a block diagram of a multiprocessor system integrated circuit using shared memory.

This invention is useful in a multiprocessor integrated circuit such as illustrated in FIG. 1. Example multiprocessor integrated circuit 100 includes: six central processing units 111, 112, 113, 114, 115 and 116; a shared memory controller 120 including six local shared memory controllers 121, 122, 123, 124, 125 and 126 connected to corresponding central processing units and central shared memory controller 129; and shared memory 130 including separately energizable memory banks 131, 132, 133 and 134. Multiprocessor integrated circuit 100 includes plural central processing units sharing a common memory. Note the number of central processing units and memory bank shown in FIG. 1 is exemplary only. This architecture creates problems solved by this invention.

Each of the central processing units 111 to 116 is a stand-alone programmable data processor. In the preferred embodiment these have the same instruction set architecture (ISA). This is known as homogenous multiprocessing. However, this invention is also applicable to heterogeneous multiprocessing in which the central processing unit employ two or more ISAs. Each central processor preferably includes a processing core for data processing operations, a data register file for temporary storage of operand data and results data and instruction and data cache. Each central processing unit operates under its own program. Each central processing unit uses shared memory controller 120 to access programs and data in shared memory 130.

Shared memory controller (SMC) 120 interfaces central processing units 111, 112, 113, 114, 115 and 116 to shared memory 130. In the preferred embodiment shared memory 130 is at the same level in the memory hierarchy as second level (L2) cache in central processing units 111, 112, 113, 114, 115 and 116. SMC 120 includes: Local SMC (LSMC) 121, 122, 123, 124, 125 and 125 and Central SMC (CSMC) 129. This partition is done to keep the data processor specific logic in the LSMC and the memory bank specific logic in the CSMC.

Figure 2:
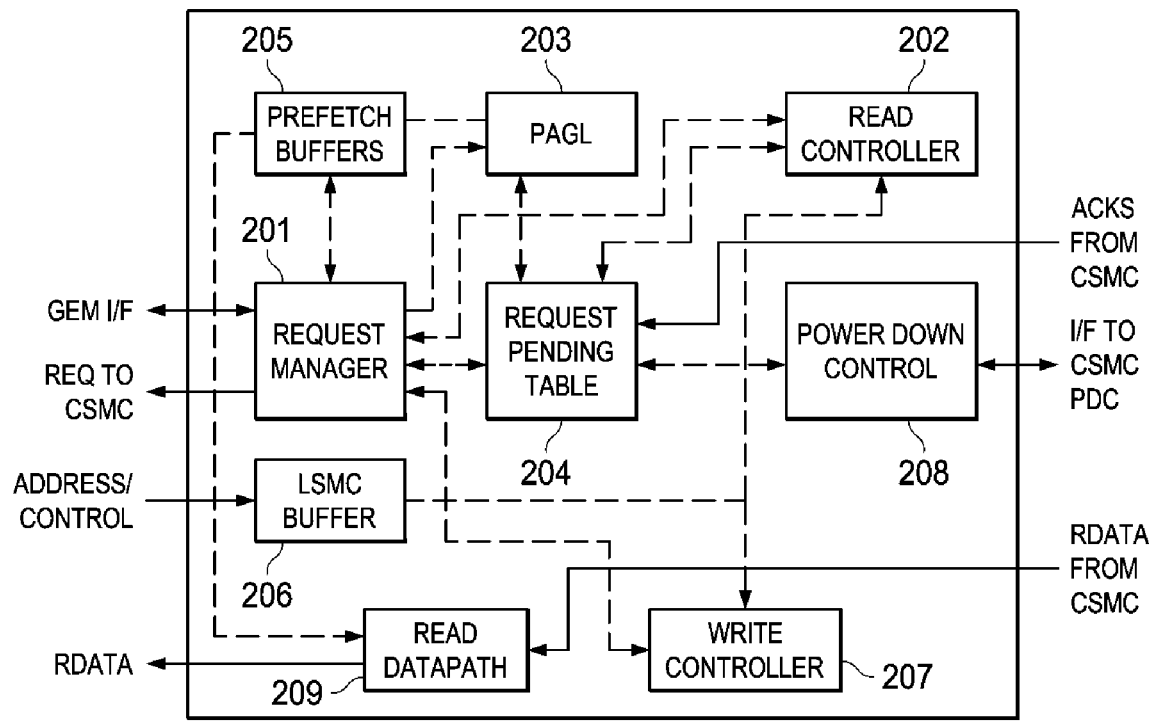
FIG. 2 is a block diagram of the local shared memory controller corresponding to one of the processors of the multiprocessor system.

FIG. 2 illustrates an exemplary local shared memory controller 121. LSMC 121 includes: request manager 201; read controller 202; prefetch access generation logic (PAGL) 203; request pending table 204; prefetch buffers 205; LSMC buffer 206; write controller 207; power down controller 208; and read datapath 209.

Request manager 201 interfaces with the corresponding CPU interface. Request manager 201 decodes the requests from CPU 111 and controls the different blocks with in LSMC 121. Request manager 201 handles the lookup of the prefetch buffers and figures out if a CPU 111 access hits or misses the prefetch buffers. Request manager 201 generates a system ready signal taking individual components of ready from read controller 202 and write controller 209. Request manager 201 controls read datapath 209 to CPU 111. Request manager 201 submits the read requests and prefetch requests to CSMC 129.

Read controller 202 manages all the read requests that go to memory banks 131, 132, 133 and 134. Read controller 202 contains per bank state machines that submit read requests to CSMC 129. Read controller 202 contains logic to stall CPU 111 using the ready signal.

Prefetch access generation logic 203 generates the prefetch requests to CSMC 129 to fill prefetch buffers 205. PAGL 203 calculates the addresses to be prefetched based on the type of access by CPU 111. Request manager 201 controls PAGL 203 when killing or aborting a prefetch request.

Request pending table 204 maintains the status of access requests and prefetch requests. Request pending table 204 splits incoming acknowledge signals from CSMC 129 for requests sent from LSMC 121 into real access and prefetch acknowledgments. Real access acknowledgments are routed to CPU 111 and read controller 202. Prefetch acknowledgments are routed to prefetch buffers 205. Request pending table 204 includes a number of entries direct mapping the number of logical memory banks 131, 132, 133 and 134.

Prefetch buffers 205 include data buffers for each logical memory bank 131, 132, 133 and 134. Thus the preferred embodiment includes four data buffers. Prefetch buffers 205 store prefetched data and address tags. Whenever a stored address tag matches the address of an access on the CPU interface and the prefetch data is valid, this data is directly forwarded from prefetch buffers 205 to CPU 111 without fetching from the corresponding memory bank.

LSMC buffer 206 is a per-CPU command register which buffers the address and control signals on every access from the CPU. In the case of a write access, LSMC buffer 206 also buffers the write data.

Write controller 207 handles write requests from CPU 111. Writes use a token-based protocol. CSMC 129 has 4 per-bank write buffers. Writes from all CPUs arbitrate for a write token to write into the per-bank write buffers. Write controller 207 handles the token request interface with CSMC 129.

Power down controller 208 communicates with its counterpart in CSMC 129. Whenever the CSMC 129 power down controller requests a sleep or wakeup, power down controller 208 ensures that LSMC 121 is in a clean state before allowing the CSMC 129 power down controller to proceed.

Read datapath 209 receives control signals from request manager 201 corresponding to the type of access. Read datapath 209 multiplexes data from either prefetch buffer 205 or the memory data from CSMC 129 which is registered and forwarded to CPU 111.

Figure 3:
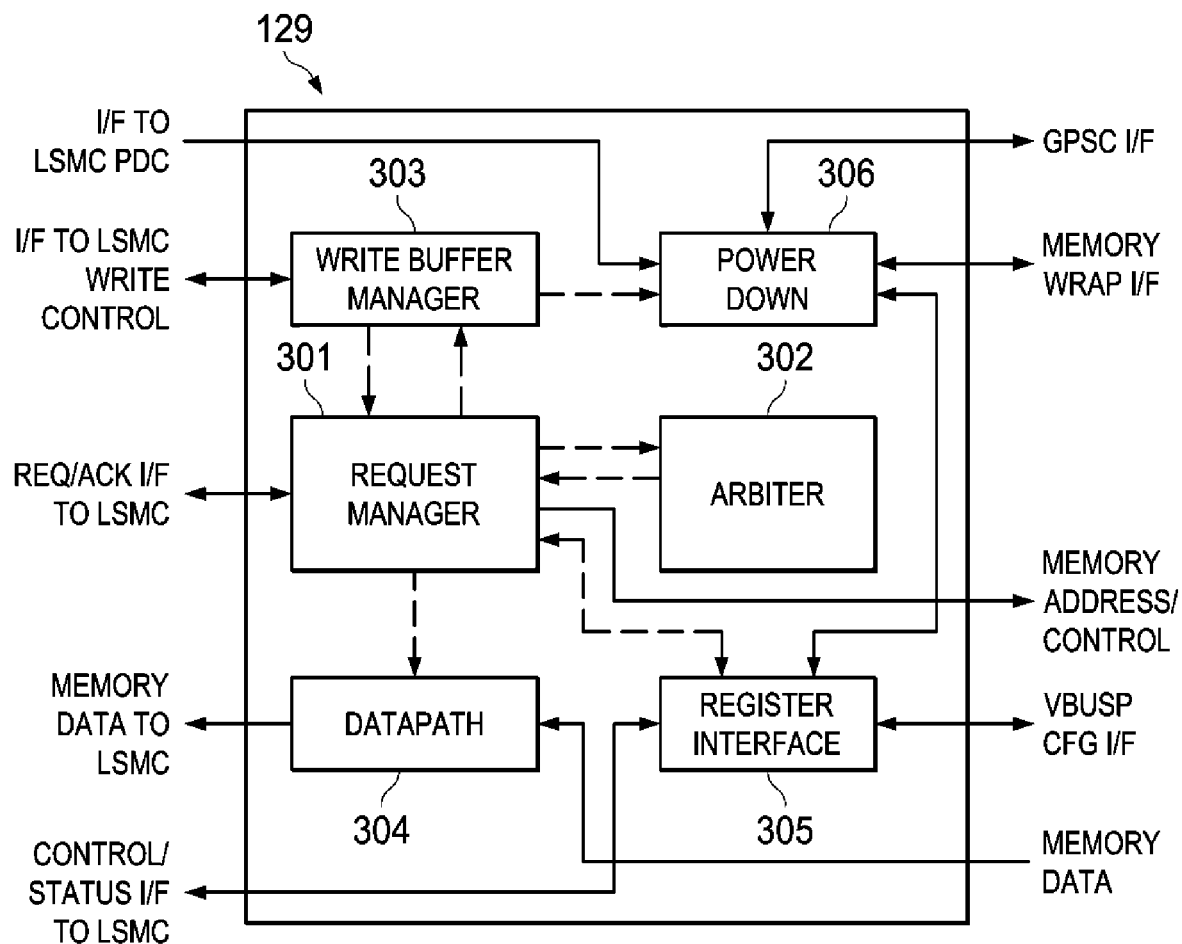
FIG. 3 is a block diagram of the central shared memory controller of the multiprocessor system.

FIG. 3 illustrates an exemplary central shared memory controller 129. Central shared memory controller (CSMC) 129 includes: request manager 301; arbiter 302; write buffer manager 303; datapath 304; register interface 305; and power down controller 306.

Request manager 301 receives requests from all CPUs 111 to 116. Request manager 301 submits these requests to a corresponding per-bank arbiter. Request manager 301 generates the memory control signals based on the signals from the CPU which won the arbitration. Request manager 301 contains the atomic access monitors which manage atomic operations initiated by a CPU.

Arbiter 302 is a least recently used (LRU) based arbiter. Arbiter 302 arbitrates among requests from all six CPUs for each memory bank 131, 132, 133 and 134. Arbitration uses the following priority. Write requests have the highest priority. Only one write request will be pending to any particular bank at a time. Real read requests have the next lower priority. A real read request is selected only if there are no pending write requests from any CPU. Prefetch requests have the lowest priority. Prefetch requests are selected only if there are no write requests or real read requests from any CPU.

Among CPUs requesting access at the same priority level, arbiter 302 implements a standard LRU scheme. Arbiter 302 has a 6 bit queue with one entry per CPU in each queue. The head of the queue is always the LRU. If the requester is the LRU, then it automatically wins the arbitration. If the requester is not the LRU, then the next in the queue is checked and so on. The winner of a current arbitration is pushed to the end of the queue becoming the most recently used. All other queue entries are pushed up accordingly.

Write buffer manager 303 contains per-bank write buffers. Write buffer manager 303 interfaces with the token requests from a write controller 207 of one of the LSMCs 121 to 126. Token arbitration uses a LRU scheme. Each per-bank write buffer of write buffer manager includes six finite state machines, one for each CPU. These finite state machines control generation of token requests to arbiter 302. Write buffer manager 303 registers and forwards the token grant from arbiter 302 to the corresponding CPU. Upon receiving the token grant the CPU has control of the per-bank write buffer and proceeds with the write.

Datapath 304 multiplexes between data from different memory pages and forwards data to the LSMC of the CPU which won the arbitration.

Register interface 305 supports a VBUSP interface through which software can program several registers. These registers control the operation of shared memory controller 120. Signals are exported from the register interface to different blocks in LSMCs 121, 122, 123, 124, 125 and 126 and CSMC 129.

Power down controller 306 interfaces with the programmable registers through which software can request a sleep mode or wakeup of memory banks 131, 132, 133 and 134. Power down controller 306 interfaces with the power down controller 208 of each LSMC 121, 122, 123, 124, 125 and 126, and memory wrappers to put the memory banks 131, 132, 1332 and 134 into sleep mode and wakeup.

Figure 4:
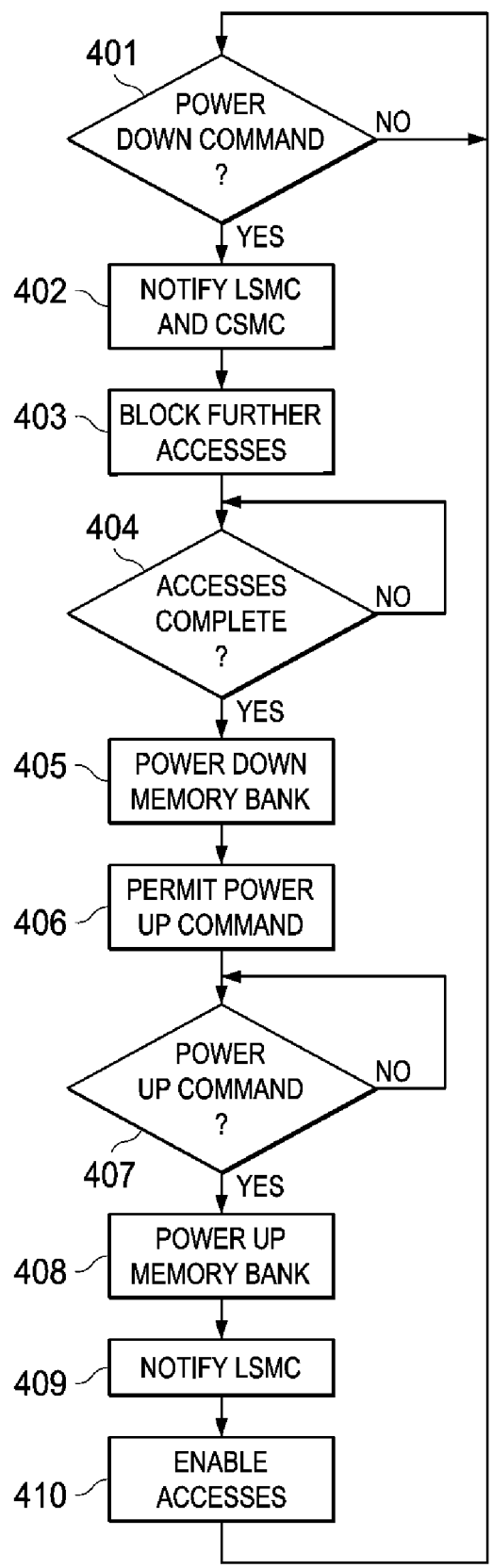
FIG. 4 is a flow chart of the power controller portion of the this invention.

FIG. 4 is a flow chart illustrating the operation of this invention for a single memory bank. This invention is carried out independently for the memory banks 131, 132, 133 and 134. The power down controller 208 in the LSMC and power down controller 306 in CSMC 129 of this invention each have two stable states for each memory bank, power up and power down. In decision block 401 power down controller 306 in CSMS 129 is in the power up state. Decision block 401 looks for a power down command. This block repeats if no power down command is received (No at decision block 401).

Upon receipt of a power down command (Yes at decision block 401), in block 402 power down controller 306 notifies he each LSMC 121 to 126. Block 403 causes each LSMC 121 to 126 to block further memory access to the corresponding memory bank. In block 404 each LSMC 121 to 126 checks to determine if the current in process accesses are complete. If these accesses are not complete (No at decision block 404), block 404 waits for these in-flight accesses to complete.

Upon receipt of a power down command (Yes at decision block 401), in block 402 power down controller 306 notifies the LSMC 121 to 126. Block 403 causes the LSMC to block further memory access to the corresponding memory bank. In block 404 the LSMC checks to determine if the current in process accesses are complete. If these accesses are not complete (No at decision block 404), block 404 waits for these in-flight accesses to complete.

When the in progress accesses complete (Yes at decision block 404), in block 405 the LSMC signals CSMC 129 and power down controller 306 powers down the memory bank. The LSMC power down controller 208 and CSMC power down controller 306 are now both in the power down state. Block 406 then again permits the power up command. In decision block 407 power down controller 306 looks for a power up command. Block 407 remains in power down state if no power up command is received (No at decision block 408).

Upon receipt of a power up command (Yes at decision block 408), in block 408 power down controller 306 powers up the corresponding memory bank. In block 409 power down controller 306 notifies the LSMC power down controller 208. Block 410 in the LSMC power down controller 208 then enables further memory access to the corresponding memory bank. Flow returns to block 401.

What is claimed is:

1. A method of power control of a shared memory having plural independently powerable memory banks in a multiprocessor system including a plurality of data processors comprising the steps of:

for each independently powerable memory bank of said shared memory system
upon receipt of a power down command for a memory bank blocking further memory accesses to said memory bank from any of the plurality of data processors,
waiting for completion of pending accesses for said memory bank,
powering down said memory bank, and
permitting power up command for said memory bank.

2. The method of claim 1, further comprising the steps of:
controlling shared memory access via a plurality of local memory controllers, each local memory controller connected to a corresponding one of the plurality of data processors, and a central memory controller connected to each local memory controller and each memory bank of the shared memory;
upon receipt of a power down command for a memory bank notifying local memory controllers corresponding to each data processor of said multiprocessor system; and
upon receipt of a power down command for a memory bank notifying the central memory controller for said multiprocessor system.

3. A multiprocessor system comprising:
a shared memory having plural independently powerable memory banks;
a plurality of data processors, each of said plurality of data processors operable to access said shared memory; and
a memory power controller connected to said shared memory and said plurality of data processors, said memory power controller operable to control supply of power to each of said independently powerable memory banks whereby for each independently powerable memory bank of said shared memory system
upon receipt of a power down command for a memory bank blocking further memory accesses to said memory bank from any of the plurality of data processors,
waiting for completion of pending accesses for said memory bank,
powering down said memory bank, and
permitting power up command for said memory bank.

4. The multiprocessor system of claim 3, wherein: said memory power controller includes
a plurality of local memory controllers, each local memory controller connected to a corresponding one of the plurality of data processors, and
a central memory controller connected to each local memory controller and each memory bank of the shared memory; and
said memory power controller further operable
upon receipt of a power down command for a memory bank notifying local memory controllers corresponding to each data processor of said multiprocessor system, and
upon receipt of a power down command for a memory bank notifying the central memory controller for said multiprocessor system.

* * * * *